United States Patent [19]

Sullivan, Sr.

[11] Patent Number: 5,106,282
[45] Date of Patent: Apr. 21, 1992

[54] APPARATUS FOR RAPIDLY LAYING UP, AND CURING THICK COMPLEX SHAPED RESIN MATRIX COMPOSITES

[75] Inventor: Fletcher R. Sullivan, Sr., Los Gatos, Calif.

[73] Assignee: FMC Corporation, Chicago, Ill.

[21] Appl. No.: 451,663

[22] Filed: Dec. 18, 1989

[51] Int. Cl.$^5$ .................. B29C 33/10; B29C 33/28
[52] U.S. Cl. ...................... 425/112; 425/390; 425/402; 425/413; 425/414; 425/418
[58] Field of Search ............. 264/257, 258, 102, 510, 264/511, 571; 425/112, 125, 258, 388, 390, 402, 403.1, 413, 414, 418

[56] References Cited

U.S. PATENT DOCUMENTS

| | | | |
|---|---|---|---|
| 4,475,976 | 10/1984 | Mittelstadt | 264/258 |
| 4,608,220 | 8/1986 | Caldwell | 425/389 |
| 4,659,071 | 4/1987 | Woltron | 425/112 |
| 4,735,667 | 4/1988 | Johnston | 156/175 |
| 4,842,668 | 6/1989 | Monetti | 264/258 |

Primary Examiner—Jay H. Woo
Assistant Examiner—Jeremiah F. Durkin, II
Attorney, Agent, or Firm—A. J. Moore; R. C. Kamp; R. B. Megley

[57] ABSTRACT

An apparatus is disclosed for rapidly laying up and curing thick complex shaped resin matrix composites connected to a rotatable and alterable male mold to wrap a plurality of continuous and intermittent layers of uncured laminate around the male mold when said mold is in a closed position; moving the male mold into a female mold and thereafter severing all layers on the male mold and articulate the male mold to an open position which shapes the upper regions of the composite and thereafter transferring the resin matrix composite to a female mold which shapes the composite in a desired configuration and thereafter heat cures the composite lay-up while being subjected to a vacuum. A second embodiment of the invention uses a non-rotatable male mold.

9 Claims, 6 Drawing Sheets

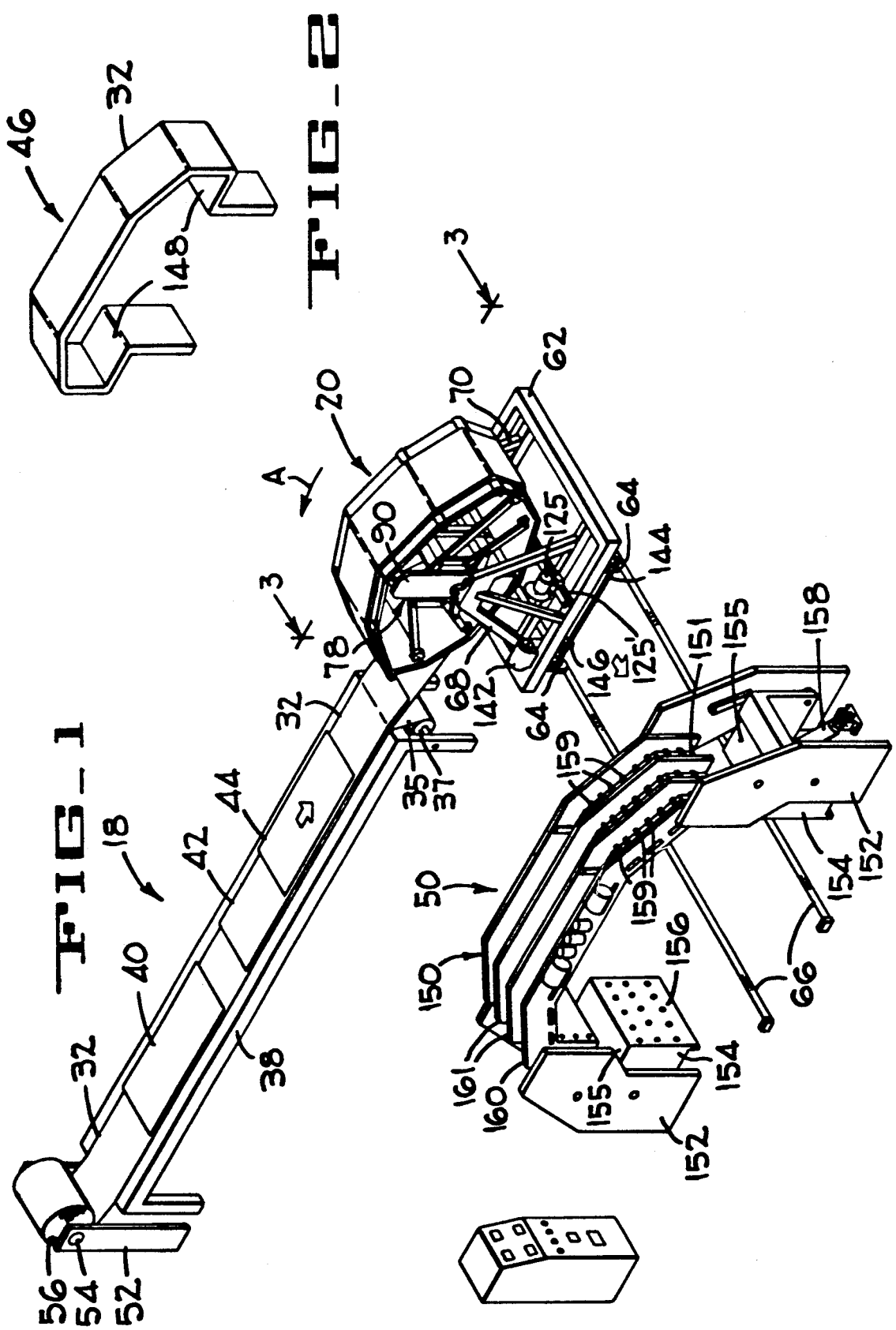

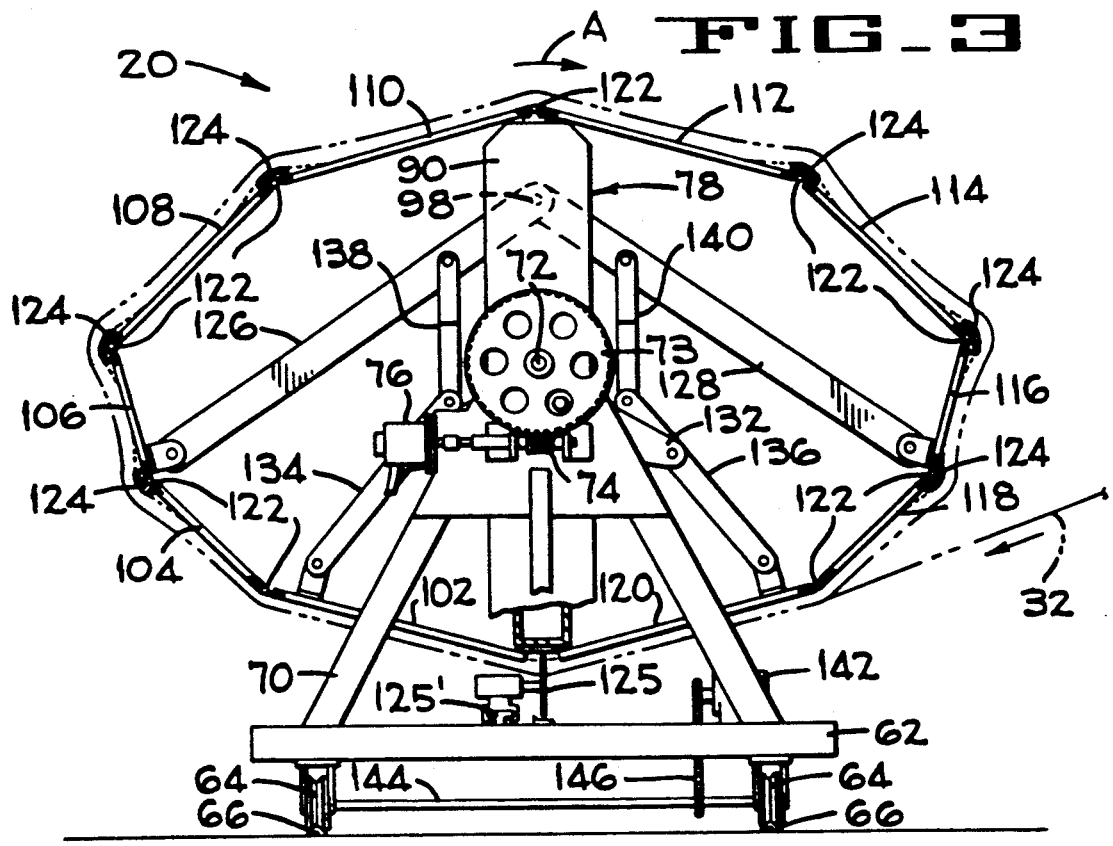
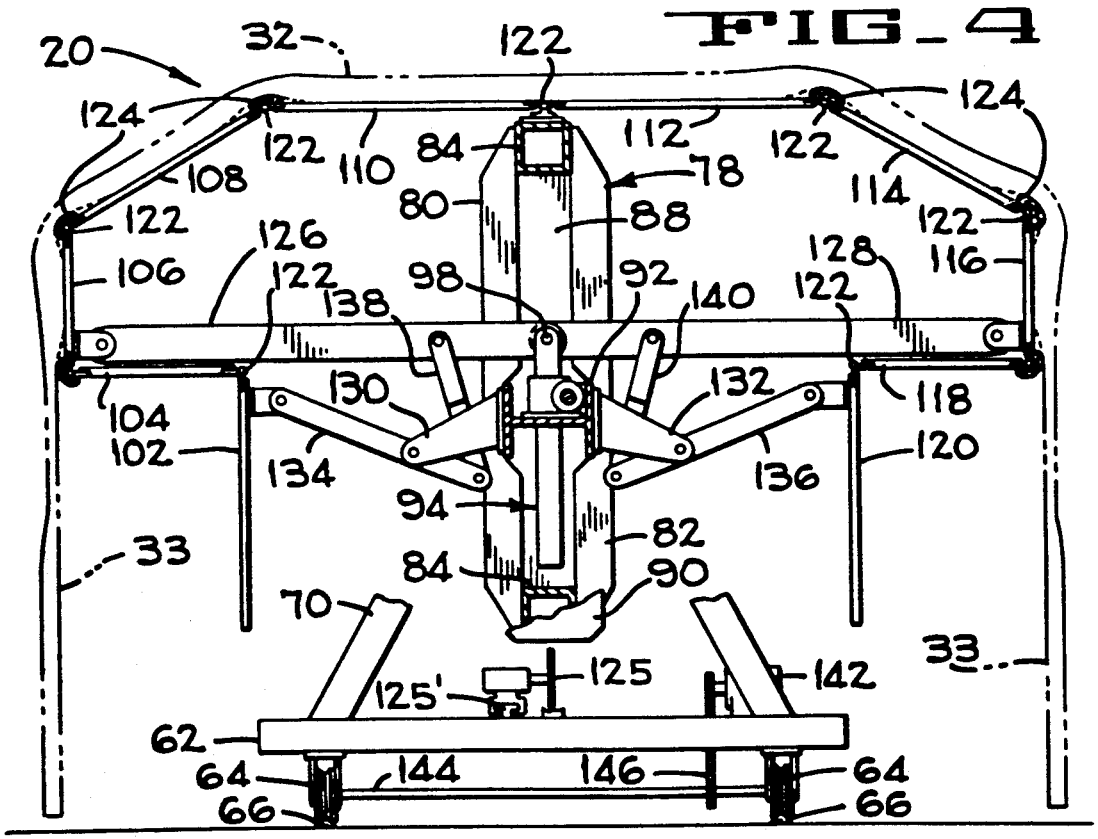

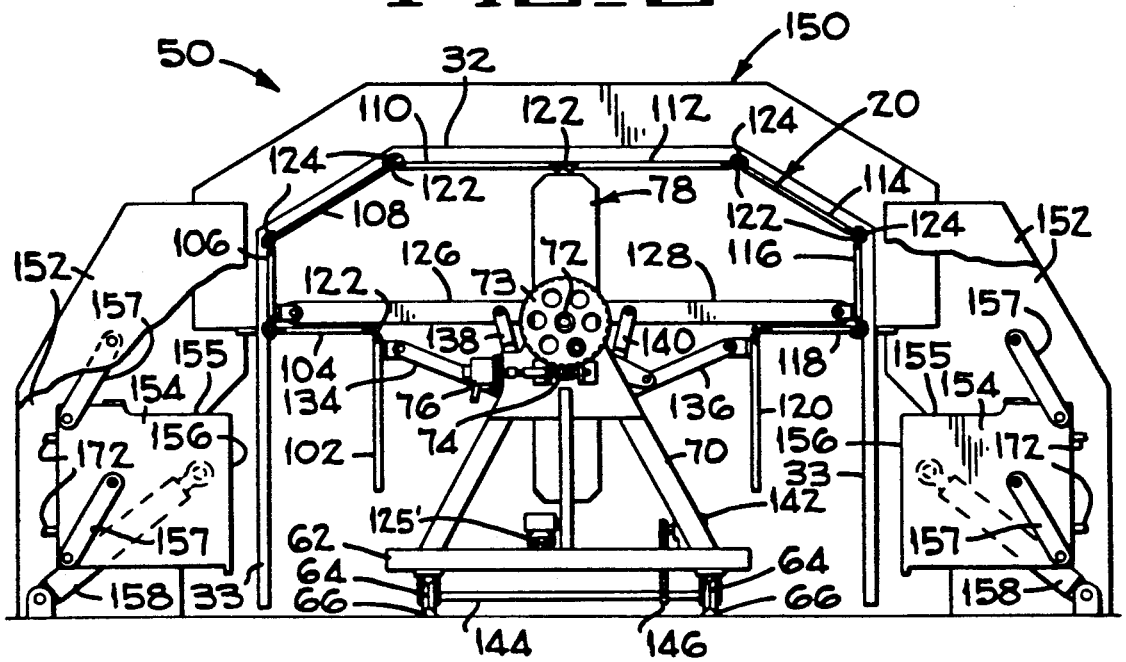
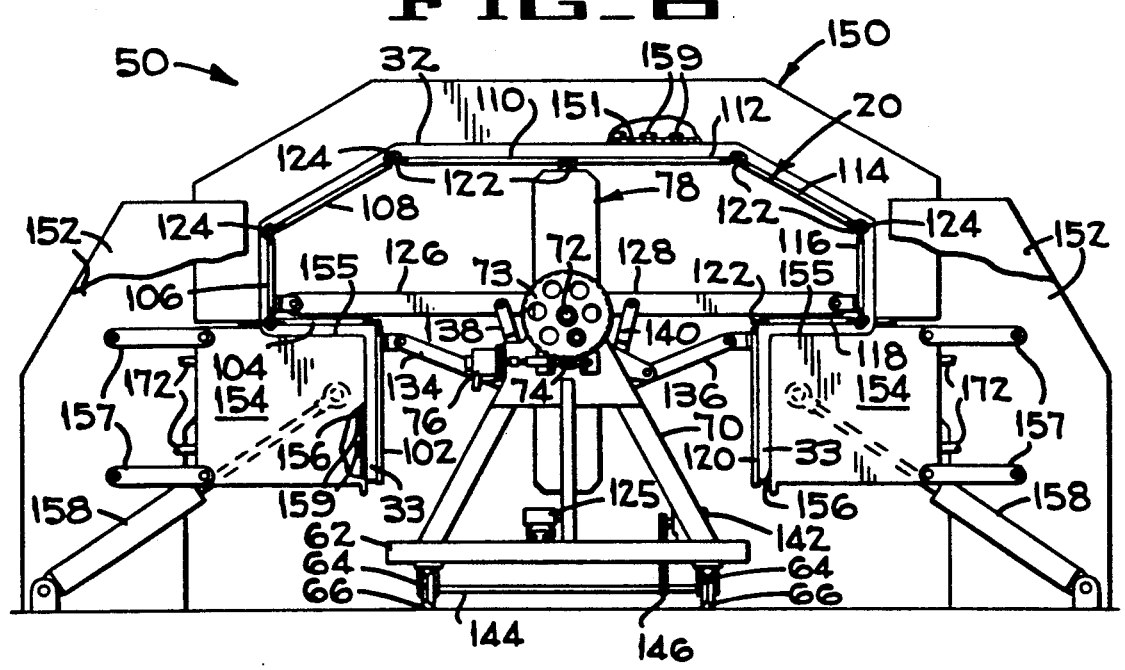

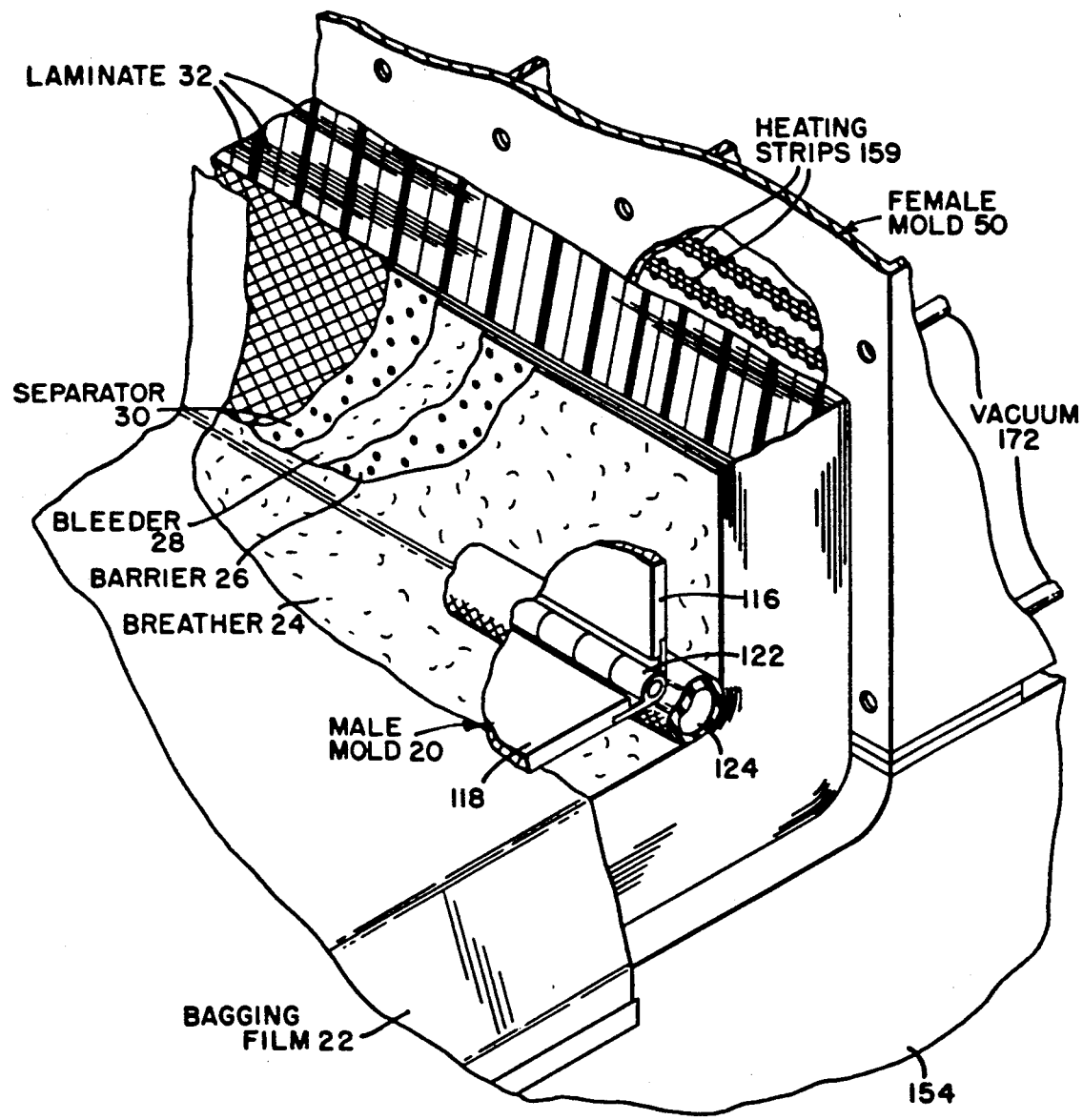
FIG_7

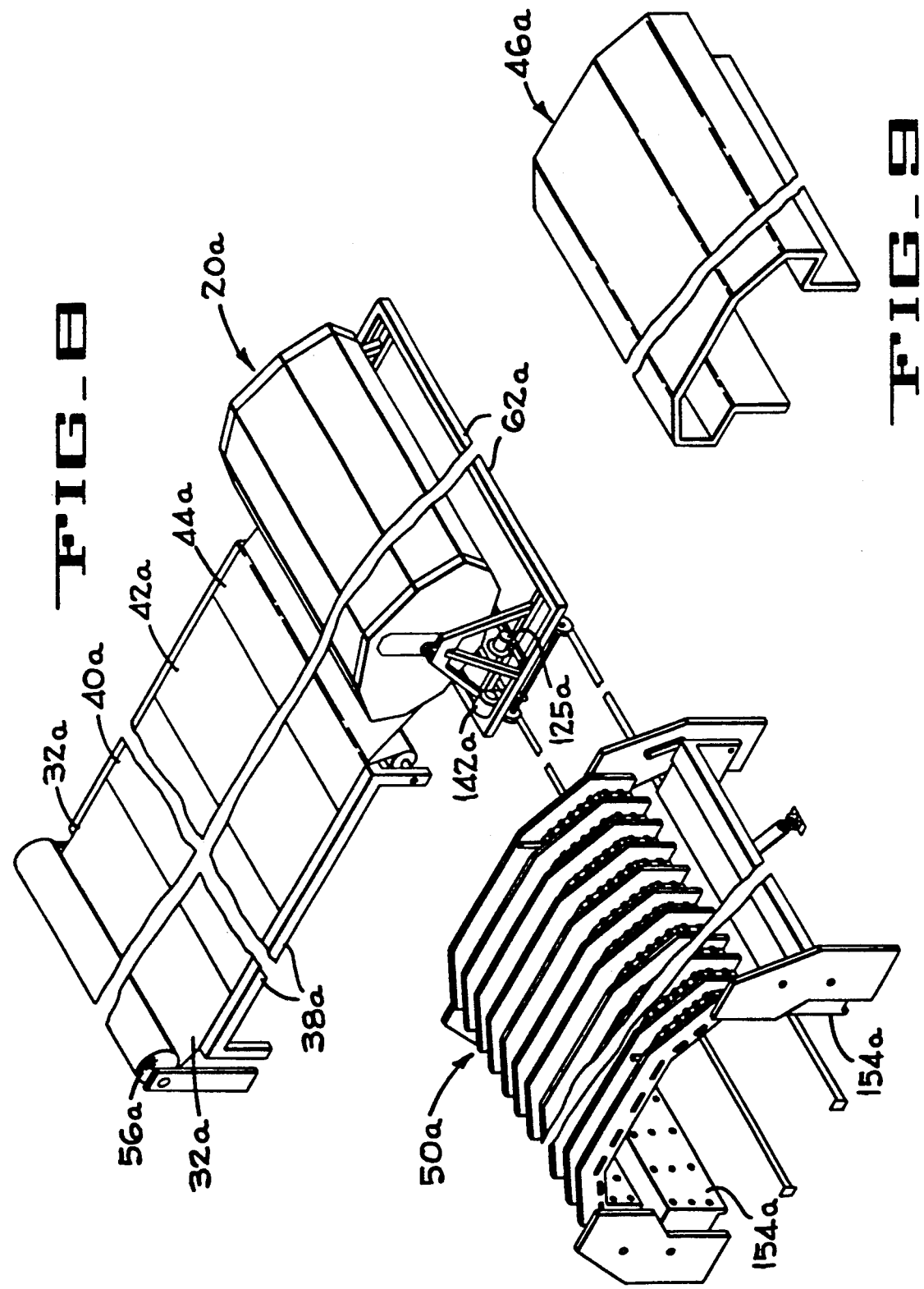

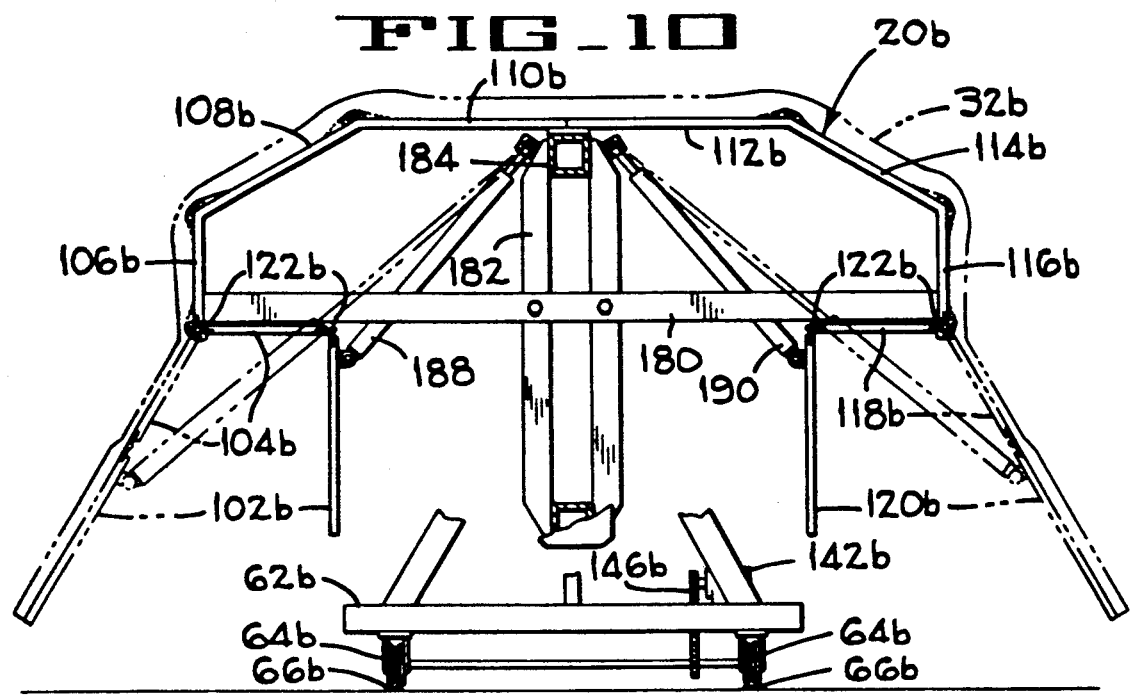
FIG_10
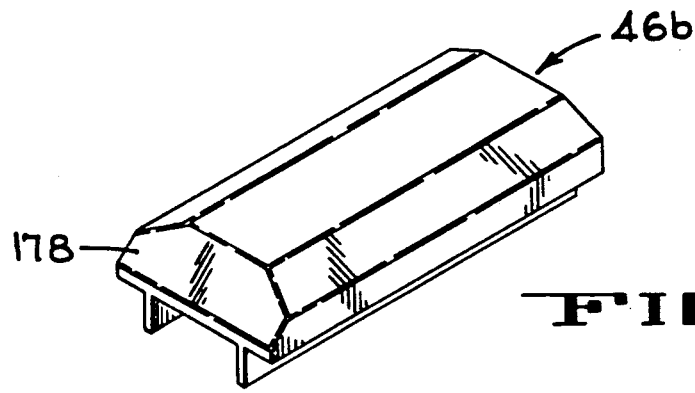
FIG_11
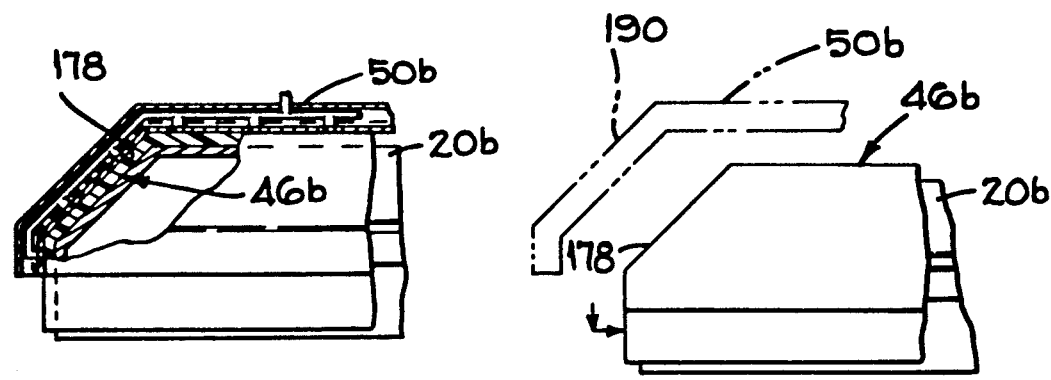
FIG_12
FIG_13

5,106,282

APPARATUS FOR RAPIDLY LAYING UP, AND CURING THICK COMPLEX SHAPED RESIN MATRIX COMPOSITES

BACKGROUND OF THE INVENTION

1. Field of the Invention

The present invention relates to method and apparatus for forming thick complex shaped composites into bodies for military vehicles or the like with a minimum of hand labor.

2. Description of the Prior Art

The prior art known to Applicant utilizes female molds and hand placing individual pieces of prepreg side by side to form each layer or ply of the laminate and repeating this procedure for each of the many layers. Since gravity would cause the prepreg to fall away from downwardly facing surfaces, the molds were limited to only one half of the structure to be made, and therefore required left and right hand molds. The two half-parts of the object being formed requires a splice joint to form a complete structure. The spliced joints are complex and laborious and of reduced strength relative to the two halves of the object being formed.

SUMMARY OF THE INVENTION

In accordance with the present invention the speed of making large composite structures has been greatly improved and simplified by continuously wrapping a plurality of layers of fiber reinforced resins, hereinafter referred to as laminate, upon a male mold having an alterable shape followed by transferring the uncured laminate onto an alterable female mold for forming the uncured laminate shape to a desired shape and thereafter heat curing the uncured laminate while under vacuum when in the female mold at an accelerated rate.

DESCRIPTION OF THE DRAWINGS

FIG. 1 is a diagrammatic perspective of a first embodiment of the invention illustrating a dispensing roll of laminate being pulled over a layout table by a rotatable articulating male mold which, with the laminate, is subsequently moved within an articulating female mold for curing and forming a structure illustrated as a composite vehicle body, the length of the vehicle body and apparatus being minimized for simplicity.

FIG. 2 is a perspective of a narrow section of the thick composite vehicle body.

FIG. 3 is a rear elevation looking in the direction of arrows 3—3 of FIG. 1 of the articulating male mold illustrating a mechanism for rotating the male mold and structure for articulating portions of the mold from a closed position to an open position.

FIG. 4 is an end elevation with parts in section of the male mold similar to FIG. 3 but illustrating the mechanism for articulating the male mold when in an open position, and further illustrating portions of the articulating mechanism with the laminate shown in phantom.

FIG. 5 is an elevation similar to FIG. 4 but illustrating the male mold in its fully open position within the female mold and with the laminate shown in full lines.

FIG. 6 is an elevation similar to FIG. 4 except that the male mold and female mold are illustrated with both the male and female molds in their composite forming positions.

FIG. 7 is an enlarged perspective of fragments of the male and female molds in operative composite forming position illustrating one type of heaters, several laminate plys, and a separator layer, a bleeder layer, a barrier, a breather, and bagging film, all of which are used for curing the composite when subjected to heat and vacuum.

FIG. 8 is a perspective of a second embodiment of the invention which is substantially the same as the first embodiment except the second embodiment illustrating elongated male and female molds having a full laminate width swath of laminate being wound around the male mold.

FIG. 9 is a section of the wound and cured composite body of the second embodiment, with parts cut away.

FIG. 10 is an end view of a male mold of a third embodiment of the invention illustrating a modified non-rotatable male mold adapted to have layers and pieces of laminate and other elements required for curing being mounted on the non-rotatable male mold for making composite bodies with different cross-sectional shapes.

FIG. 11 is a perspective at a smaller scale of an elongated composite body having a downwardly sloping end portion.

FIG. 12 is an enlarged fragment of the composite body of FIG. 11 with parts cut away to illustrate a portion of a sloping male mold therein supporting the laminate before curing.

FIG. 13 is an enlarged fragment of the composite body after the body has been cured illustrating the composite body being lowered away from the female mold onto the male mold for subsequent removal therefrom.

DESCRIPTION OF THE PREFERRED EMBODIMENT

A first embodiment of the apparatus 18 (FIG. 1) of the present invention in general includes a male mold 20 (FIG. 1) which is an articulatable power drive male mold that is movable between a closed position and an open position. A layer of bagging film 22 (FIG. 7) followed by one or two of breather layers 24, a barrier layer 26, a bleeder 28 (sometimes referred to as a blotter), and a separator layer 30 are first attached to the mold 20 which subsequently aids in curing the laminate by heating while under vacuum as will be described in detail hereinafter.

The male mold 20 (FIG. 1) is then driven in the direction illustrated by the arrow A in FIGS. 1 and 3) and pulls a laminate layers 32 (commonly known as a prepreg), having a backing strip 35 which is removed from the bottom of the sticky laminate 32 by a driven roller 37 after first moving across a layout table 38 for attachment to the male mold 20. The male mold 20 is then driven to pull the laminate over the table and to then wind a plurality of layers of laminate onto the male mold. As diagrammatically illustrated in FIG. 1, thickening pieces of laminate 40, 42 and 44 are cut from other rolls of laminate (not shown) and are placed at precise locations on the laminate strip 32 for thickening desired areas of a finished product illustrated as a fragment of a body 46 (FIG. 2) of a military vehicle (not shown) or the like. After the desired number of plies and pieces of laminate have been wound on the male mold 20, the rotation of the male mold 20 is stopped.

The male mold 20 is then inserted into a female mold 50 as shown in FIG. 5, and all layers of laminate are severed at the lower midpoint of the male mold. The male mold is then articulated to the position illustrated in FIG. 4, and the female mold is articulated into laminate curing position as illustrated in FIG. 6. The laminate is then cured with heat and pressure into the desired shape. During curing, the male mold 20 may be removed from the female mold and returned to its laminate receiving configuration (FIG. 1) for accepting material for making another composite article.

More specifically, the composite forming apparatus includes a roll supporting stand 52 (FIG. 1) which includes a shaft 54 upon which a roll 56 of laminate 32 having the lower protective film 35 thereon to prevent the sticky laminate 32 from adhering to other objects. As the laminate moves to the right (FIG. 1), the lower protective film 35 is wound on the lower protective film roller 37 which is driven by conventional means (not shown) for wrapping the lower protective film 35 thereon.

The male mold 20 is supported on a car 62 having wheels 64 riding on tracks 66 which extend between the layout table 38 and the female mold 50.

The male mold is supported on the car 62 by rigid frames 68,70 (FIGS. 3-6). A shaft 72 is journaled on the frame 68,70 and has a worm wheel 73 keyed thereto which meshes with a worm gear 74 that is connected to and driven by a gear motor 76 thereby driving the rotary frame 78 of the male mold 20. The rotary portion 78 of the male mold includes two spaced pairs of legs 80,82 (FIG. 4) which are rigidly secured to horizontal box beams 84 and end plates 88, 90.

An I-beam 92 is rigidly secured between the pairs of legs 80,82; and the I-beam has two drive mechanisms 94 such as ball screw drives or the illustrated cylinders 94 attached thereto, only one being shown in FIG. 4.

When the male mold 20 is in the laminate receiving position and is driven by a motor 76 as shown in FIG. 3, the laminate is wound around a plurality of panels 102, 104, 106, 108, 110, 112, 114, 116, 118 and 120. All of the panels except panels 102 and 120, are pivotally connected together by hinges 122 with the uppermost hinge being partially supported on the upper box beam 84 (FIG. 4). Pressure chambers or pressure tubes 124, such as fire hoses, are provided outwardly of several of the hinges and the laminate. These pressure chambers 124 serve to move portions of the laminate upwardly and outwardly from the surface of the male mold 20 toward the surfaces of the female mold after being moved to the position shown in FIG. 5.

As previously mentioned, after the desired amount of laminate has been wound around the male mold 20, the lower surface of the laminate is severed by a cutter such as a circular saw 125 (FIGS. 3-6). The saw 125 is slidably supported on a pedestal 125' secured to the car 62 and may be manually pushed or be power driven to sever the several layers of laminate.

The pivot pins 98 (FIG. 4) (only one being shown) pivotally connects a pair of long pivot arms 126, 128 together, which long arms are pivotally attached to the panels 106, 116, respectively. Brackets 130, 132 are secured to the I-beam 92, and pivotally support intermediate length pivot arms 134, 136, respectively, which arms are pivotally attached to panels 102 and 120. Short links 138, 140 are pivotally attached between intermediate pivot arms 134, 136 to the long pivot arms 126, 128, respectively. As illustrated in FIG. 4, when the piston rod 94 is retracted, the several pairs of linkages of the male mold 20 are in position to enter the female mold 50 as illustrated in FIGS. 5 and 6.

In the illustrated prototype of the invention the male mold 20 is manually pushed in and out of the female mold 50. However, a reversible motor 142 secured to the car 62 and connected to an axle 144 by a chain drive 146 may be used to drive the male mold into and out of the female mold.

FIG. 5 illustrates the male mold 20 articulated into its laminate forming position within the female mold 50 which is shown in its open position with end portions 33 of the laminate 32 extending vertically downward within the female mold 50.

A fixed portion or roof 150 (FIG. 6) comprises a bent steel plate 151 shaped to form the upper external dimensions of the sidewalls and roof of the desired shape of the upper portion of the composite vehicle body 32. The bent steel plate 151 is rigidly secured to legs 152. Movable shoes or wings 154 of the female mold 50 each include horizontal plates 155 and vertical plates 156 suspended by parallelogram linkages 157. Power means 158 such as ball screw drives move the wings 154 between their inactive positions illustrated in FIG. 5 and active positions illustrated in FIG. 6.

Both the roof 150 and the shoes or wings 154 of the female mold 50 are equipped with integral heating means such as the electric resistant heating elements 159, only three being illustrated in FIG. 6.

As best illustrated in FIG. 1, the vertical end walls 160 and a plurality of vertical intermediate walls 161 of the roof 150 are welded to the bent steel plate 151 of the roof 150 at spaced intervals to reinforce the bent steel plate 151 from sealing pressures applied by the shoes 154. Power means such as ball screw drives 158 are connected between the legs 152 and the shoes 154 and are actuated by conventional control means (not shown) to move the shoes 154 between their inoperative positions shown in FIG. 5 and their operative positions shown in FIG. 6.

When in the operative position illustrated in FIG. 6 the end portions 33 of the laminate 32 are folded into right angle sections to form sponsons 148 of the preferred body 46 (FIG. 2).

As mentioned previously, when the laminate 32 is being cured when in the female mold 50, (FIG. 7) the bagging film 22, the breather 24, the barrier 26, the bleeder 28 and the separator 30 all bear against the plurality of plies of uncured laminate 32.

More particularly the bagging film 22 may be a two mil nylon throw-away bag or can be a permanent rubber bag. The breather 24 is preferably one layer of 1/16th of an inch heavy felt with two layers being optional. The barrier 26 is preferably two mil polytetrafluoroethylene commonly known as (Teflon) with small holes of about 0.045 inches at 2 inch centerlines. The bleeder or "blotter" 28 is preferably 0.032 inch felt that soaks up extra resin by percolating air with the resin. The separator 30 is polytetrafluoroethylene (Teflon) but with more and larger holes than in the barrier 26. Sixty-nine plies of laminate were used to form the thickest portions of the complex shaped composite body of the military vehicle and 22 plies for the thinnest sections. It will, of course, be understood that other thick composites may be formed with different numbers of laminate plies, different shapes and different breathers, barriers, bleeders and separators.

In order to cure the thick complex shaped composite objects from a plurality of composite laminate layers 32 (FIG. 7), heat is applied to the outer surfaces of the roof 150 (FIG. 5), and to the vertical plates 156 of the upwardly and inwardly movable wings 154 by serpentine heating strips 159 as illustrated in FIG. 6. It will be understood, however, that heat may be applied by hot liquids, vapors, or gases, and that radiant heating or electrical resistant heating may also be used. The desired temperature range can be selected such that the heated tool face is maintained a set amount above the resin cure/postcure range, depending upon the resin characteristics.

While being cured, a vacuum up to 14.7 psi is applied to the inside surface of the laminate. It will be noted that the resin is cured by rapidly applying heat from one side and vacuum from the other side. It will also be noted that compaction of the female radii is accomplished by inflatable intensifiers or tubes 124 located on the male mold 20 and energized so as to apply pressure suddenly and repeatedly to produce a hammering or forging effect.

In operation of the first embodiment of the invention the male mold 20 (FIG. 1) is first placed in its closed position as illustrated in FIG. 1 and the previously mentioned layers of bagging film 22, (FIG. 7), breather 24, barrier 26, bleeder 28 and separator 30 are wound around and attached to the closed male mold 20. The above operation is performed by energizing the motor 76 (FIG. 3) which aids in wrapping the several materials around the male mold 20, and thereafter these materials are attached to the male mold. Thereafter, the male mold is aligned with the layout table 38, if not already in alignment with the table.

Although the method and apparatus of the present invention can be used to form other composites, it will be assumed that in the following description the body 46 of a military vehicle is being formed.

When forming the body 46 of the military vehicle, a roll 56 of laminate or prepreg 32 (FIG. 1) is rotatably supported on the stand 52 and is trained over the layout table 38. The lower prepreg protection film 35 is wound around the lower film roll 37. The laminate 32 is connected to the male mold 20 and the male mold is driven in the direction of the arrow A in FIG. 1. Prepreg pieces 40, 42 and 44 may be cut to size on a separate table (not shown) and may be manually, or automatically laid on the laminate lay-up 32 in precise locations so that the thickest layers will be on the flat top of the roof, and the next thickest layers would be on the angle portions of the roof and on the upper vertical side walls. The laminate layer 40 (FIG. 1), would thicken the lower two vertical pieces (FIG. 2) of the body 46 which would subsequently be cut in half to form two vertical body portions. The two horizontal sponsons 148 are least likely to be hit by a weapon and would therefore have the thinnest cross section.

In the illustrated first embodiment, the flat roof requires 69 layers of 0.023 ply laminate, the horizontal sponsons 148 require only 22 layers, and the remainder of the hull structure requires 44 layers. It will be understood, however, that other numbers of layers of laminate material may be used depending upon the expected size of the weapon used against the military vehicle.

After the layers of laminate have been wound around the closed male mold 20, and the male mold has been positioned within the female mold, the circular saw 125 (FIG. 1) is moved along the track 125' (by means not shown) to sever the plurality of laminate layers 32, the bagging film 22 (FIG. 7), the breather 24, the barrier 26, the bleeder 28 and the separator 30 at their lowest point as illustrated in FIG. 3 causing the laminate 32 and the other components to hang downwardly as illustrated in FIG. 4.

The male mold 20 is then articulated into the position shown in FIG. 5 by actuating the drive mechanism 94 (FIG. 4). The pressure chambers or hoses 124 are then abruptly and repeatedly inflated to move portions of the laminate upwardly and outwardly from the surface of the male mold 20 to the surface of the female mold 50 at the locations of female radii as shown in FIG. 6.

The molding shoes or wings 154 are then positioned by actuating the ball screw drives 158 so that the wings 154 that are suspended by the parallelogram linkages 157, move inwardly and upwardly while maintaining their horizontal and vertical faces in their respective attitudes while moving inwardly and upwardly. This operation moves and forms the lower portions of the lay-up into the horizontal and vertical sponsons. The bagging material or film 22 (FIG. 7) is then securely attached to the roof 150 and wings 154 of the female mold 50 in airtight engagement to define an envelope around the laminate being processed. Vacuum and heat are then applied to start curing the composite material.

After curing has begun, the reversible motor 142 (FIG. 5) is energized and the male mold 20 is driven out of the female mold 50 and into position in alignment with the layout table 38. The male mold 20 is then articulated into the closed position illustrated in FIG. 3 by first energizing the drive mechanism 94 (FIG. 4) and then the reversible motor 76 (FIG. 3), and the process is repeated by wrapping other layers of materials illustrated in FIG. 7 onto the male mold while the first laminate is being cured in the female mold 50.

Tests have been conducted using the above described method and apparatus which resulted in the composite section of the composite vehicle body 46 illustrated in FIG. 2. It will be noted that by using the wrapping method of the present invention, the entire cross-sectional shape of the body, as opposed to making two halves of the body, results in a much sturdier body since two halves spliced together provide a very weak area at the splice.

It has been determined by tests made with the first embodiment of the invention that the wrapping technique over the male mold, which makes a full section of the body, not a half section, took two men ten hours to wrap the section.

Moving the male mold 20 into the female mold 50 and articulating the male and female molds into the position illustrated in FIG. 6, plus attaching the vacuum bag to the female mold 50, the wings 154, the roof 150, and the walls 151, took two hours and thirty-one minutes to cure and postcure with the heaters and vacuum described above. Complete reaction of the resin throughout the thickness and breadth of the laminate provided the cure. Performing further polymerization of a cured laminate to enhance mechanical and physical properties provided the postcure.

In comparison to the time required by Applicant's method and apparatus to form the same body section but in two pieces, rather than one piece, it took three men nine days to prepare one-half section. Vacuum bag oven cure and postcure required eighteen hours for the one-half section.

A larger version in the form of a second embodiment of the molding apparatus of the present invention is illustrated in FIG. 8 and is similar to the first version except that the male mold 20a and the female mold 50a are much longer, for example, 20 feet long, thereby allowing a full width swath of the laminate to be wound upon the male mold 20a from a roll 56a of laminate 32a to form a full length composite body 46a.

Since the larger version or second embodiment of the invention is quite similar to that of the first version, components of the larger version which are similar to those of the first version will be assigned the same numerals followed by the letter "a".

When placed in operation, motor 142a is activated and drives car 62a and male mold 20a into alignment with table 38a for receiving the wide laminates being wound about the elongated male mold 20a.

The long male mold 20a is then driven fully within the elongated female mold 50a. After the full length section has been formed on the male mold, the saw motor 125a is then energized to sever the layers of laminate at the bottom of the male mold 20a, and is thereafter articulated into the open position which is similar to that illustrated in FIG. 4 of the first embodiment. Thereafter the elongated male mold 20a is moved into the female mold 50a and is articulated into a position similar to that illustrated in FIG. 6 of the first embodiment of the invention. Thereafter the laminate 32a is cured by heat and vacuum in the same manner as that disclosed in the first embodiment. As in the first embodiment, the male mold 20a may be driven out of the female mold after the laminate 32a has been urged upwardly against the inner surface of the female mold by vacuum and mechanical force exerted by the wings 154a. The completed one-piece composite may then be heat cured and removed from the male mold 20a by conventional means.

A third embodiment of the invention is illustrated in FIGS. 10–13 and is designed to make long composite structures having different cross-sectional configurations throughout their length and/or widths. In this regard, an apparatus is shown as making an upper body 46b of a military vehicle which includes a downwardly angled end portion 178.

Since the third embodiment of the invention is similar to the first embodiment, components of the third embodiment which are similar to those of the first or second embodiment will be assigned the same numerals followed by the letter "b".

The male mold 20b is similar to that of the first embodiment except that the male mold is non-rotatable, and the plurality of layers of laminate 32b, and also the laminate thickening pieces not shown but similar to pieces 40, 42 and 44 (FIG. 1) are cut into the desired length and are manually placed on the male mold 20b after first having placed the bagging film, the breather, the barrier, the bleeder and the separator on the male mold as illustrated in FIG. 7.

Having reference to FIG. 10, the male mold 20b is mounted on the car 62b which includes wheels 64b supported on tracks 66b and is driven along the tracks by a reversible motor 142b and chain drive 146b. The male mold 20b includes a pair of transverse horizontal arms 180 (only one being shown) which are secured to a non-rotatable frame 182 rigidly secured to the car 62b by triangular end frames (only fragments of one being shown). A longitudinally extending box beam 184 and the longitudinal arms 180 (only one being shown) support panels 106b, 108b, 110b, 112b, 114b and 116b which are rigidly secured together and to the non-rotatable frame 182.

Additional elongated panels 104b and 102b are pivoted together and to the panel 106b by hinges 122b; while panels 118b and 120b are likewise pivoted together and to panel 116b. After the sticky laminate 32b has been manually laid upon the several panels at which time the panels 102b, 104b, 118b and 120b are in their dotted line positions. Drive mechanisms such as ball screw drives 188 and 190 are pivotally connected between the non-rotatable frame 182 and the panels 102b and 120b for moving the panels 102b, 104b and 118b, 120b between their laminate receiving positions shown in dotted lines and their curing positions shown in solid lines.

It will be understood that when the laminate is being manually or automatically placed on the male mold 20b, that full width layers will overlap short layers so as to form an integral laminate body without seams.

FIG. 11 illustrates the appearance of a completed laminate body 46b with the downwardly angled end portion 178.

FIG. 12 illustrates the laminate body 46b with the angled end portion 178 when being cured; and FIG. 13 illustrates the female mold 50b with angled end portion 190 after being released from the elongated laminate composite body 46b after the body has been cured in the female mold 50b. The female mold is the same as that illustrated in FIG. 8 except that an end portion of the roof 190 is angled downwardly as shown in FIG. 13.

It will be appreciated that after the laminate body 46 has been cured and the wings 154 have been lowered, the vacuum will be released thus allowing the cured composite body 46b to become supported on the elongated male mold 20b. The male mold 20b is then moved in reverse out of the female mold 50b thereby allowing fork trucks or the like (not shown) to remove the cured composite body 46b with the downwardly angled end portion from the area of the molding apparatus 18.

From the foregoing description it is apparent that the molding method and apparatus of the present invention is capable of rapidly and accurately forming thick composite bodies by using articulating male and female molds, and either placing the laminate on the male mold mechanically or by hand. The method and apparatus also minimizes seams in the mold and substantially decreasing the time required for laying up and curing the laminate.

Although the best mode contemplated for carrying out the present invention has been herein shown and described, it will be apparent that modification and variation may be made without departing from what is regarded to be the subject matter of the invention.

What is claimed is:

1. An apparatus for rapidly laying up and curing complex shaped resin matrix composites, comprising:
   means for laying up uncured laminate material upon an alterable male mold having an alterable mold shape to facilitate lay-up;
   means defining an alterable female mold;
   means for transferring said uncured laminate lay-up material from said alterable male mold to said alterable female mold;
   means for forming the mold shape of the uncured laminate lay-up material to a desired shape when in the female mold;
   means for heat curing the uncured laminate lay-up material while supported on said female mold; and
   means for subjecting said uncured laminate lay-up material to a vacuum when being heated and cured.

2. An apparatus according to claim 1 including means for altering the shape of a pair of two-piece lower portions of said alterable female mold between linear hanging positions and angled positions to form the uncured lower portions of the laminate into the desired shape, and for easy removal of the resulting cured resin matrix composite from said female mold.

3. An apparatus according to claim 1 wherein said means for transferring the uncured laminate lay-up material from said alterable male mold to said alterable female mold including:

means for applying mechanical pressure from said female mold for applying upward and inward pressure on lower portions of said complex shaped resin matrix composites; and means for applying a vacuum between the uncured laminate and said female mold.

4. An apparatus for laying up complex shaped resin matrix composites, comprising:

means defining an alterable male mold having a rotatable frame mounted for rotation about an axis;

means defining a plurality of panels pivotally connected together and to said frame for pivotable movement between a closed position and an open position;

selectively operable power means for rotating said alterable male mold when in said closed position for wrapping a plurality of layers of resin matrix composite therein;

means for severing said plurality of layers of resin matrix composite in a plane containing said axis of rotation; and means for articulating said alterable male mold into said open position after said plurality of layers of resin matrix composite has been severed.

5. An apparatus according to claim 4 wherein certain panels of said alterable male mold are positioned normal to each other when said articulated male mold is in said open position.

6. An apparatus according to claim 4 wherein said alterable male mold is mounted on a mobile car for movement into a female mold, and wherein said female mold includes articulating wings which cooperate with said alterable male mold for forming said resin matrix composite into the desired shape and for curing said resin matrix composite.

7. An apparatus according to claim 6 wherein said articulating wings function to firmly press said resin matrix composite against said female mold for enhancing curing, of said resin matrix composite.

8. An apparatus according to claim 4 wherein a plurality of panels are connected together by a plurality of hinges for providing said male mold with said alterable, mold male shape, and additionally comprising inflatable pressure tubes disposed outwardly of a plurality of said hinges for moving portions of the laminate upwardly and outwardly from surfaces of the male mold against surfaces of the female mold for positively compacting the uncured laminate into female radii of the female mold.

9. An apparatus according to claim 8 wherein said male mold is non-rotatable, and wherein said alterable male mold and female mold include beveled end portions for forming a beveled end wall.

* * * * *